United States Patent
Sankaran et al.

(10) Patent No.: US 9,639,856 B2
(45) Date of Patent: *May 2, 2017

(54) BEHAVIORAL KEYWORD IDENTIFICATION BASED ON THEMATIC CHANNEL VIEWING

(71) Applicant: Verizon Patent and Licensing Inc., Basking Ridge, NJ (US)

(72) Inventors: Anand N. Sankaran, Tamil Nadu (IN); Amitkumar Singh, Chennai (IN); Nishanth Madichetti, Chennai (IN); Jubish C. Parambath, Tamil Nadu (IN); Anil K. Guntupalli, Irving, TX (US); Lisa A. Caputo, Dade City, FL (US); Govinda R. Yenda, Andhra Pradesh (IN)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/921,304

(22) Filed: Oct. 23, 2015

(65) Prior Publication Data
US 2016/0055529 A1 Feb. 25, 2016

Related U.S. Application Data

(63) Continuation of application No. 13/569,819, filed on Aug. 8, 2012, now Pat. No. 9,172,999.

(51) Int. Cl.
*H04N 7/10* (2006.01)
*H04N 7/025* (2006.01)
(Continued)

(52) U.S. Cl.
CPC ..... *G06Q 30/0255* (2013.01); *H04N 5/44543* (2013.01); *H04N 7/17318* (2013.01); *H04N 21/23109* (2013.01); *H04N 21/251* (2013.01); *H04N 21/25891* (2013.01); *H04N 21/44222* (2013.01); *H04N 21/4532* (2013.01); *H04N 21/4667* (2013.01); *H04N 21/4668* (2013.01);
(Continued)

(58) Field of Classification Search
None
See application file for complete search history.

(56) References Cited

U.S. PATENT DOCUMENTS 6,993,245 B1 * 1/2006 Harville ........... H04N 5/76
348/E7.061
7,653,627 B2 1/2010 Li et al.
(Continued)

*Primary Examiner* — Jonathan V Lewis

(57) ABSTRACT

A method, performed by a computer device, may include obtaining a viewing history, associated with a customer, from a set-top box associated with the customer, wherein the viewing history relates a particular television channel to a duration time associated with the particular television channel. The method may further include determining a keyword, associated with the customer, based on the obtained viewing history; calculating a keyword score for the keyword based on the obtained viewing history; selecting an advertisement, associated with the keyword, based on the calculated keyword score; and providing the selected advertisement to the set-top box associated with the customer, based on selecting the advertisement.

20 Claims, 10 Drawing Sheets

(51) Int. Cl.

| | | |
|---|---|---|
| *G06F 3/00* | (2006.01) | |
| *G06F 13/00* | (2006.01) | |
| *H04N 5/445* | (2011.01) | |
| *G06Q 30/02* | (2012.01) | |
| *H04N 21/442* | (2011.01) | |
| *H04N 21/45* | (2011.01) | |
| *H04N 21/472* | (2011.01) | |
| *H04N 21/482* | (2011.01) | |
| *H04N 7/173* | (2011.01) | |
| *H04N 21/81* | (2011.01) | |
| *H04N 21/258* | (2011.01) | |
| *H04N 21/466* | (2011.01) | |
| *H04N 21/231* | (2011.01) | |
| *H04N 21/25* | (2011.01) | |
| *H04N 21/658* | (2011.01) | |
| *H04N 21/8405* | (2011.01) | |

(52) U.S. Cl.
CPC ..... *H04N 21/47214* (2013.01); *H04N 21/482* (2013.01); *H04N 21/4828* (2013.01); *H04N 21/6582* (2013.01); *H04N 21/812* (2013.01); *H04N 21/8405* (2013.01)

(56) References Cited

U.S. PATENT DOCUMENTS

| | | | | |
|---|---|---|---|---|
| 7,818,319 | B2 | 10/2010 | Henkin et al. | |
| 8,037,496 | B1 * | 10/2011 | Begeja | G11B 27/034 725/136 |
| 8,122,047 | B2 * | 2/2012 | Kanigsberg | G06F 17/30867 707/765 |
| 8,272,009 | B2 | 9/2012 | Downey et al. | |
| 8,321,890 | B2 * | 11/2012 | Murakami | G06Q 10/00 705/14.49 |
| 8,433,611 | B2 | 4/2013 | Lax et al. | |
| 8,468,083 | B1 | 6/2013 | Szulczewski | |
| 8,561,107 | B1 * | 10/2013 | O'Neil | H04N 21/42207 725/39 |
| 8,645,991 | B2 * | 2/2014 | McIntire | H04N 7/17318 725/34 |
| 8,751,305 | B2 * | 6/2014 | Manoogian, III | G06Q 30/0269 705/14.49 |
| 8,751,418 | B1 * | 6/2014 | Sutter | G06Q 30/0255 706/12 |
| 8,776,111 | B1 * | 7/2014 | Eldering | H04H 60/66 705/14.49 |
| 9,043,860 | B2 * | 5/2015 | Lee | G06Q 30/02 705/14.53 |
| 9,159,083 | B1 * | 10/2015 | Johnson | G06Q 30/0255 |
| 9,210,368 | B2 * | 12/2015 | Stone | H04N 5/782 |
| 2002/0059584 | A1 * | 5/2002 | Ferman | G06F 17/30017 725/34 |
| 2002/0087979 | A1 * | 7/2002 | Dudkiewicz | G06F 17/30017 725/34 |
| 2002/0184622 | A1 | 12/2002 | Emura et al. | |
| 2004/0133469 | A1 * | 7/2004 | Chang | G06Q 30/0255 705/14.53 |
| 2006/0259299 | A1 | 11/2006 | Kato et al. | |
| 2007/0060099 | A1 * | 3/2007 | Ramer | G06F 17/30867 455/405 |
| 2007/0150341 | A1 * | 6/2007 | Zia | G06Q 30/02 705/14.53 |
| 2007/0169148 | A1 * | 7/2007 | Oddo | H04N 5/44543 725/46 |
| 2009/0112848 | A1 | 4/2009 | Kunjithapatham et al. | |
| 2009/0222329 | A1 | 9/2009 | Ramer et al. | |
| 2010/0269134 | A1 * | 10/2010 | Storan | G06Q 30/02 725/34 |
| 2011/0072448 | A1 * | 3/2011 | Stiers | H04N 7/17318 725/10 |
| 2011/0238495 | A1 | 9/2011 | Kang | |
| 2011/0251988 | A1 * | 10/2011 | Pronk | G06F 17/30035 706/46 |
| 2011/0258049 | A1 | 10/2011 | Ramer et al. | |
| 2012/0042339 | A1 | 2/2012 | Kitts et al. | |
| 2012/0221687 | A1 | 8/2012 | Hunter et al. | |
| 2013/0066709 | A1 | 3/2013 | Riley | |
| 2013/0263017 | A1 | 10/2013 | Moyers et al. | |
| 2013/0297447 | A1 * | 11/2013 | Sakata | H04N 21/4826 705/26.7 |

* cited by examiner

DURATION SCORE = a * tan⁻¹(D/b) = 20/pi * tan-1 (280/1500) = 1.19
PERCENTAGE SCORE = 5
RANKING SCORE = 10 - int(10 * n/N) = 10 - int (10 * 80/500) = 8
TOTAL SCORE = a*(DURATION SCORE) + b*(PERCENTAGE SCORE)
+ c*(RANKING SCORE) = 0.2 * 1.19 + 0.5 * 5 + 0.3 * 8 = 5.138

| KEYWORD | KEYWORD SCORE | KEYWORD RANK |
|---|---|---|
| "FAMILY" | 7.2 | 1 |
| "SPORTS" | 5.138 | 2 |
| "FOOTBALL" | 3 | 3 |

BEHAVIORAL KEYWORD IDENTIFICATION BASED ON THEMATIC CHANNEL VIEWING

CROSS REFERENCE TO RELATED APPLICATIONS

This application claims priority under 35 U.S.C. sec. 120 to, and as a continuation of, U.S. patent application Ser. No. 13/569,819 entitled "Behavioral Keyword Identification Based on Thematic Channel Viewing", which has a filing date of Aug. 8, 2012, and which this application incorporates by reference in its entirety.

BACKGROUND INFORMATION

A provider of television services, such as a cable television provider, may broadcast a large number of television channels to customers. The television channels may include thematic channels. A thematic television channel may provide thematic content meant to target a specific group of users. For example, a history channel may be provided for customers with an interest in history. The provider of television services may insert, advertisements into a television channel in order to generate revenue. Selecting effective advertisements may increase revenue and improve customer satisfaction.

BRIEF DESCRIPTION OF TEE DRAWINGS

DETAILED DESCRIPTION OF PREFERRED EMBODIMENTS

The following detailed description refers to the accompanying drawings. The same reference numbers in different drawings identify the same or similar elements.

An implementation described herein relates to determining keywords associated with a customer based on a viewing history associated with the customer. Television channels, such as thematic television channels, may be assigned a particular combination identifier based on one or more categories associated with the television channels, such as, for example, genre, subgenre, and/or language. A combination identifier may be associated with one or more keywords.

A set-top box may collect information about a viewing duration time associated with each television channel that the customer has viewed within a particular time and may send the collected information to a keyword system. The keyword system may use the collected information to determine keywords associated with the television channels that the customer has viewed and may determine keyword scores for the determined keywords. A keyword score may be based on one or more factors, such as, for example, a total viewing time associated with the keyword for the customer, a ratio of the total viewing lime associated with the keyword to the total viewing time for the customer, a ratio of the total viewing time associated with the keyword to the viewing time for the keyword, associated with other customers, a number of different television channels that are associated with the keyword, and/or one or more other factors. The keyword system may select advertisements, or other type of information, for the customer based on the determined keyword scores. The selected advertisements may be provided to the user via the set-top box or via another device associated with the customer.

Figure 1:
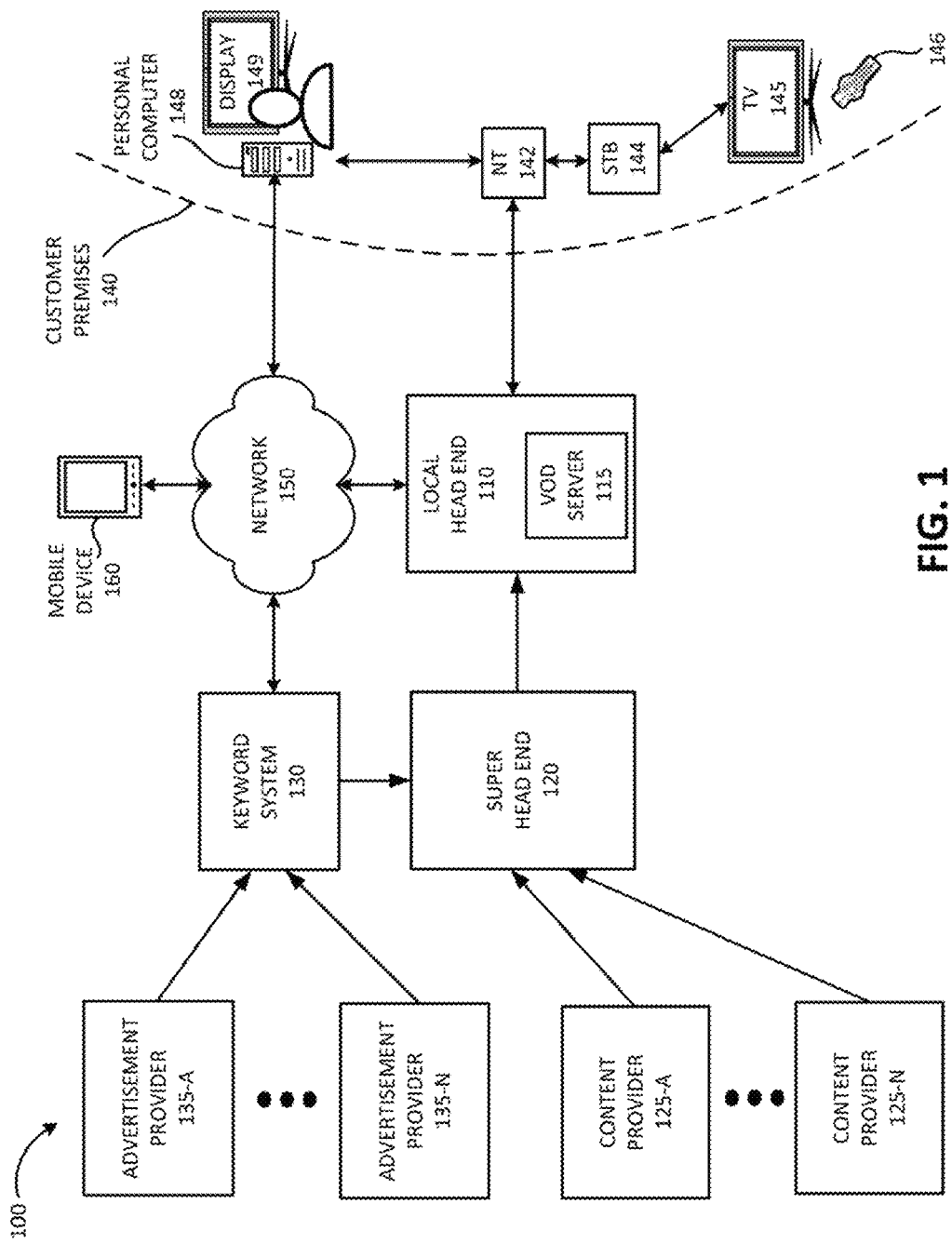
FIG. 1 is a diagram illustrating an exemplary environment according to an implementation described herein.

FIG. 1 is a diagram of an exemplary environment 100 in which the systems and/or methods described herein may be implemented. As shown in FIG. 1, environment 100 may include a local head end 110, a super head end 120, one or more content providers 125-A to 125-N (referred to herein collectively as "content providers 125" and individually as "content provider 125"), a keyword system 130, one or more advertisement providers 135-A to 135-N (referred to herein collectively as "advertisement providers 135" and individually as "advertisement provider 135"), customer premises 140, a network 150, and a mobile device 160.

While FIG. 1 depicts a single local head end 130, a single keyword system 130, a single customer premises 140, a single network 150, and a single mobile device 160 for illustrative purposes, in practice, environment 100 may include multiple local head ends 110, multiple keyword system 130, multiple customer premises 140, multiple networks 150, and/or multiple mobile devices 160.

Local head end 110 may include one or more devices, such as server devices, that ingest content, store content, format content, and/or deliver content, to customer premises 140 and/or mobile device 160. For example, local head end 110 may provide television channels, including advertisements from advertisement providers 135, to customer premises 140. Furthermore, local head end 110 may receive requests for content from customer premises 140 and/or mobile device 160. While local head end 110 is illustrated in FIG. 1 as connecting to a single customer premises 140 for explanatory purposes, in practice, local head end 110 may connect to multiple customer premises 140 (and/or to multiple mobile devices 160). For example, local head end 110 may deliver content to customer premises 140 located within a particular geographic area. Local head end 110 may include a VOD server 115.

VOD server 115 may include one or more devices, such as server devices, that store and provide content on demand. For example, VOD server 115 may include a catalog of content that may be accessed by a customer using a device associated with customer premises 140 or using mobile device 160. The customer may select a particular content (e.g., a movie) to purchase and VOD server 115 may stream the purchased content to customer premises 140 (and/or to mobile device 160) when the customer selects to consume the purchased content. Furthermore, VOD server 115 may include video content received from local government station 135 via local government portal 130.

Super head end 120 may include one or more devices, such as server devices, that ingest content, store content, format content, and/or deliver content to local head end 110. For example, super head end 120 may ingest content from, content providers 125 at a national (and/or multi-region level) and provide the ingested content to one or more local head ends 110.

Content provider 125 may include one or more devices, such as server devices, that provide content to super head end 120. For example, content, provider 125 may include free television broadcast providers (e.g., local broadcast providers, such as NBC, CBS, ABC, and/or Fox), for-pay television broadcast providers (e.g., TNT, ESPN, HBO, Cinemax, CNN, etc.), and/or Internet-based content providers (e.g., Youtube, Vimeo, Netflix, Hulu, Veoh, etc) that stream content from web sites and/or permit content to be downloaded (e.g., via progressive download, etc.). Content provider 125 may also include on-demand content providers (e.g., video on demand (VOD), pay per view (PPV), etc.).

Keyword system 130 may include one or more devices, such as server devices, that obtain information relating to a customer's viewing history from a set-top box. Keyword system 130 may further obtain advertisements from advertisement providers 135 and may associate the advertisements with particular keywords. Keyword system 130 may determine keywords associated with a customer based on the customer's viewing history and may determine keyword scores for the keywords. Keyword system 130 may rank the keywords based on the keyword scores, and may select advertisements for the customer based on the keyword scores and based on the keywords associated with the advertisements. Keyword system 130 may provide the selected advertisements to the customer via a set-top box and/or another device associated with the customer.

Advertisement provider 135 may include one or more devices, such as server devices, that provide advertisements to keyword system 130. For example, advertisement provider 135 may provide a video advertisement, an audio advertisement, a textual advertisement, a graphical advertisement, and/or another type of advertisement to keyword system 130. Advertisement provider 135 may further provide keywords associated with an advertisement to keyword system 130.

Customer premises 140 may include a particular location (or multiple locations) associated with a customer. For example, customer premises 140 may include the customer's home. Devices associated with customer premises 140, as well as mobile device 160, may receive content, such as video content, via local head end 110. Devices associated with customer premises 140, as well as mobile device 160, may be considered "user devices" and/or "network devices." Customer premises 140 may include a network terminal (NT) 142, a set top box (STB) 144, a television 145, a remote control 146, a personal computer 148, and a display 149.

NT 142 may receive content from local head end 110 via a connection, such as, for example, via a fiber optic cable connection, a coaxial cable connection, a wireless connection, and/or another type of connection. Furthermore, NT 142 may send information from a device associated with customer premises 140 to local head end 110. In one implementation, NT 142 may include an optical network terminal and NT 142 and local head end 110 may form part of a high-speed fiber optic network, (e.g., FiOS™). In another implementation, NT 142 may include a cable modem. In yet another implementation, NT 142 may include a fixed wireless transceiver. Additionally or alternatively, NT 142 may Include a layer 2 and/or layer 3 network device, such as a switch, router, firewall, and/or gateway. Customer premises 140 may receive one or more services via the connection between NT 142 and local head end 110, such as, for example, a television service, Internet service, and/or voice communication (e.g., telephone) service.

STB 144 may receive content and output the content to television 145 for display. STB 144 may include a component (e.g., a cable card or a software application) that interfaces with (e.g., plugs into) a host device (e.g., a personal computer, television 145, a stereo system, etc.) and allows the host device to display content. STB 144 may also be implemented as a home theater personal computer (HTPC), an optical disk player (e.g., digital video disk (DVD) or Blu-Ray™ disc player), a cable card, etc. STB 144 may receive commands and/or other type of data from other devices, such as remote control 146, and may transmit the data to other devices in environment 100, such as, for example, keyword system 130.

Television 145 may output content received from STB 144. Television 145 may include speakers as well as a display. Remote control 146 may issue wired or wireless commands for controlling other electronic devices, such as television 145 and/or STB 144. Remote control 146, hi conjunction with STB 1.44, may allow a customer to interact, with an application running on STB 144. Other types of devices (e.g., a keyboard, mouse, mobile phone, etc.) may be used instead of, or in addition to, remote control 146, in order to control television 145 and/or STB 144.

Personal computer 148 may include a desktop computer, a laptop computer, a tablet computer, a mobile communication device, a personal digital assistant (PDA), or another type of computation and/or communication device. Personal computer 148 may include a microphone to capture audio, a camera to capture images or video. Personal computer 148 may include display 149 for displaying images and/or video content received, from content service system 130. Personal, computer 148 may also include a speaker for playing audio signals.

Network 150 may include one or more wired and/or wireless networks. For example, network 150 may include a cellular network, the Public Land Mobile Network (PLMN), a second generation (2G) network, a third, generation (3G) network, a fourth generation (4G) network (e.g., a long term evolution (LTE) network), a fifth generation (5G) network, a code division multiple access (CDMA) network, a global system for mobile communications (GSM) network, a general packet radio services (GPRS) network, a combination of thereof, and/or another type of wireless network. Additionally, or alternatively, network 150 may include a local area network (LAN), a wide area network (WAN), a metropolitan area network (MAN), an ad hoc network, an intranet, a fiber optic-based network (e.g., a fiber optic service network), a television network, and/or a combination of these or other types of networks. Network 150 may enable local head end 110 to communicate with mobile device 160 and/or with local government portal 130.

Mobile device 160 may include a mobile communication device, such as a mobile phone, a smart phone, a tablet computer, a laptop, a PDA, or another type of portable communication device. Mobile device 160 may receive content, such as a television channel that may include advertisements from advertisement provider 135, from local head end 110 via network 150. In one embodiment, mobile device 160 may be associated with a customer account associated with customer premises 140. In another embodiment; mobile device 160 need not be associated with customer premises 140.

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
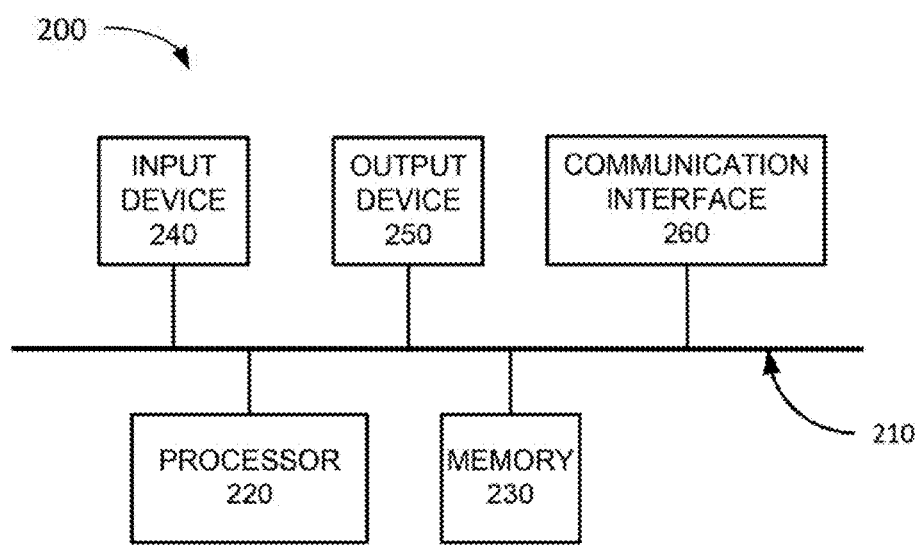
FIG. 2 is a diagram illustrating exemplary components of a device of FIG. 1.

FIG. 2 is a diagram illustrating exemplary components of a device 200 according to an implementation described herein. Keyword system 130, STB 144, personal computer 148, mobile device 160, and/or other devices in environment 100, may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions, in other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interlace 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interlace card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to obtaining information relating to a customer's viewing history, determining keywords associated with the customer, and/or providing advertisements to the customer based on the determined keywords. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally or alternatively, one or more components of device 200 may perform one or more tasks described as being performed by one or more other components of device 200.

Figure 3:
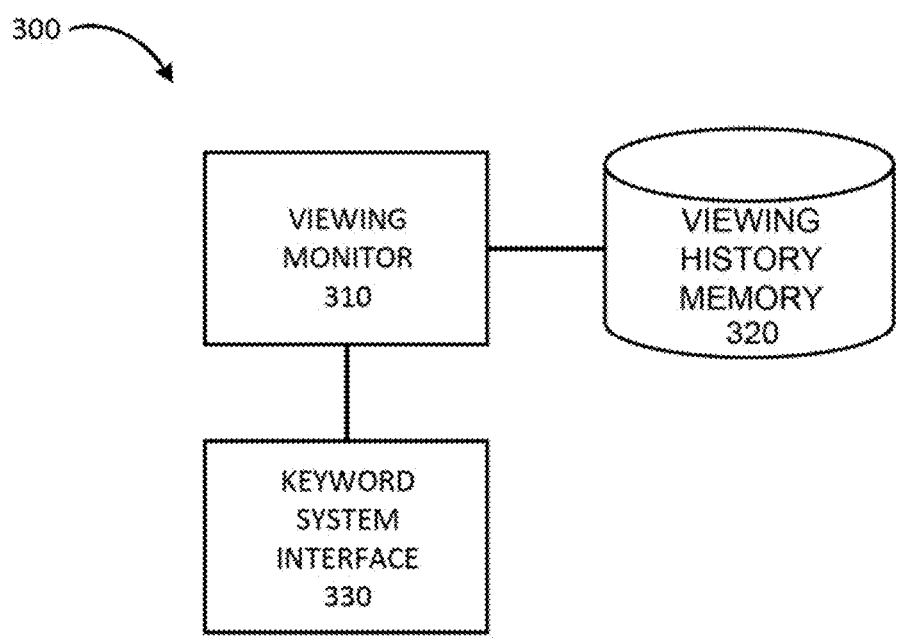
FIG. 3 is a diagram illustrating exemplary functional components of a set-top box, personal computer, or mobile device.

FIG. 3 is a diagram of exemplary functional components of a functional device 300. STB 144, personal computer 148, and/or mobile device 160 may each include a functional device 300. Functional device 300 may be implemented, for example, via processor 220 executing instructions from memory 230. Alternatively, some or all of functional device 300 may be implemented via hard-wired circuitry. In one implementation, functional device 300 may be included in STB 144 during manufacture. In another implementation, functional device 300 may be downloaded by STB 144 as an application during installation of STB 144 on customer premises 140 or during operation of STB 144 after installation. As shown in FIG. 3, functional device 300 may include a viewing monitor 310, a viewing history memory 320, and a keyword system interface 330.

Viewing monitor 310 may monitor the functioning of STB 144 and may record a selection of a particular television channel by the customer and may record a viewing time associated with the selected particular television channel. For example, when the customer switches STB 144 to another television channel, viewing monitor 310 may record the total time for which STB 144 was providing the previous television channel. Viewing monitor 310 may collect information about the customer's viewing history after obtaining permission from the customer. Viewing history memory 320 may store information collected by viewing monitor 310.

Keyword system interface 330 may provide information collected by viewing monitor 310, and stored in viewing history memory 320, to keyword system 130 at particular intervals. Furthermore, keyword system interface 330 may receive one or more selected advertisements from keyword system 130 and may provide the one or more selected advertisements at a later time. For example, a television channel may include an advertisement slot and STB 144 may insert one of the selected advertisements into the advertisement slot.

Although FIG. 3 shows exemplary functional components of functional device 300, in other implementations, functional device 300 may include fewer functional components, different functional components, differently arranged functional components, or additional functional components than depicted in FIG. 3. Additionally or alternatively, one or more functional components of functional device 300 may perform functions described as being performed by one or more other functional components of functional device 300.

Figure 4:
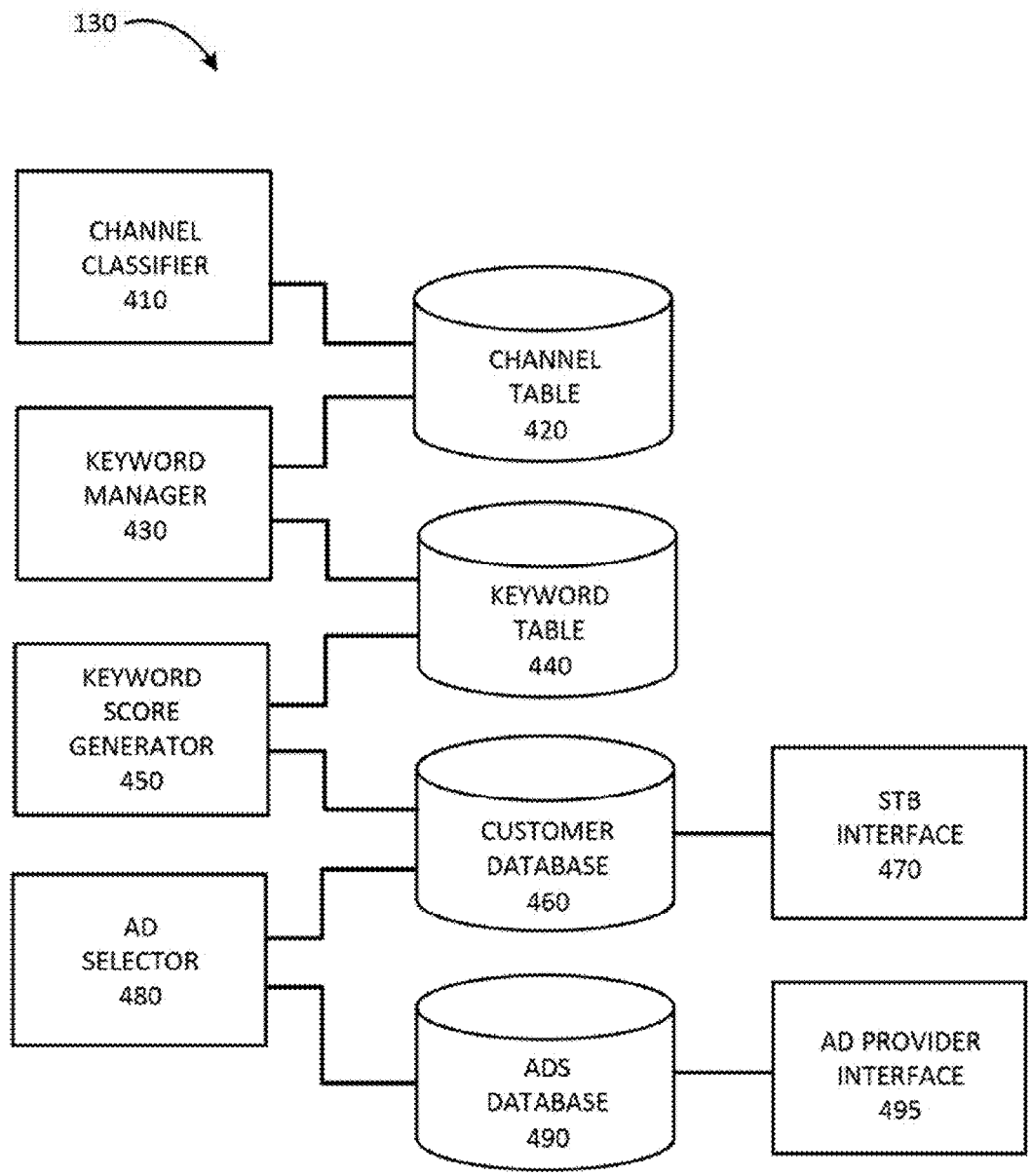
FIG. 4 is a diagram illustrating exemplary functional components of the keyword system of FIG. 1.

FIG. 4 is a diagram illustrating exemplary functional components of keyword system 130. The functional components of keyword system 130 may be implemented, for example, via processor 220 executing instructions from memory 230. Alternatively, some or all of the functional components of keyword system 130 may be implemented via hard-wired circuitry. As shown in FIG. 4, keyword system 130 may include a channel classifier 410, a channel table 420, a keyword manager 430, a keyword table 440, a keyword score generator 450; a customer database 460, an STB interface 470, an ad selector 480, an ads database 490, and an ad provider interlace 495.

Channel classifier 410 may classify a television channel into one or more categories and may assign a combination identifier to the television channel based on the one or more categories. For example, channel classifier 410 may assign a genre to the television channel, may assign a subgenre to the television, channel, may assign a language to the television channel, and/or may assign another type of category to the television channel. In one implementation, channel classifier 410 may assign the one or more categories based on input received from an administrator or based on input received from content provider 125. In another implementation, channel classifier 410 may assign the one or more categories based on content associated with the television channel. For example, channel classifier 410 may analyze metadata associated with the television channel for terms or phrases indicative of a particular genre, subgenre, language, and/or another type of category. Channel classifier 410 may store information relating to the assigned one or more categories in channel table 420. Exemplary information that may be stored in channel table 420 is described below with reference to FIG. 5A.

Keyword manager 430 may assign one or more keywords to a particular combination identifier. In one implementation, keyword, manager 430 may assign the one or more keywords to the particular combination identifier based on input received from an administrator. In another implementation, keyword manager 430 may assign the one or more keywords based on another technique. For example, keyword manager 430 may search content associated with television channels associated with the particular combination identifier, such as titles and/or descriptions of scheduled programs for terms that occur at least, a particular number of times. Keyword manager 430 may store the assigned one or more keywords in keyword table 440. Exemplary information that may be stored in keyword table 440 is described below with reference to FIG. 5B.

Keyword score generator 450 may generate a keyword score for a keyword associated with a customer. For example, keyword score generator 450 may identify combination identifiers associated with a customer, based on the customer's viewing history, and may identify keywords associated with the combination identifiers. Keyword score generator 450 may compute a duration score for a keyword based on a sum of the duration times of all television channels associated with the keyword. Keyword score generator 450 may compute a percentage score for a keyword based on a ratio of the total viewing duration for the keyword and the total viewing duration associated with the customer. Keyword score generator 450 may compute a ranking score for a keyword based on a ranking of a customer among other customers associated with the keyword, in which the ranking is based on the duration time for the keyword associated with the customer as compared to duration times for the keyword for the other customers associated with the keyword. Keyword score generator 450 may compute a keyword score for a keyword based on a weighted average of the duration score, the percentage score, and/or the ranking score. Keyword score generator 450 may rank the keywords associated, with the customer based on the computed keyword scores and may store the information, in customer database 460. Customer database 460 may store viewing history information and/or keyword information associated with particular customers. Exemplary information that may be stored in customer database 460 is described below with reference to FIG. 5D.

STB interface 470 may communicate with STB 144. For example, STB interface 470 may receive information about a viewing history associated with a customer from STB 144 associated with the customer.

Ad selector 480 may select advertisements for a customer based on keyword scores associated with the customer and based on keywords associated with advertisements stored in ads database 490. Ads database 490 may store advertisements, or information about advertisements, received from advertiser providers 135. Exemplary information that may be stored in ads database 490 is described below with reference to FIG. 5C.

Ad selector 480 may provide advertisements selected for a customer to STB 144 associated with the customer. In one implementation, ad selector 480 may provide the selected advertisements to STB 144. Additionally or alternatively, ad selector 480 may provide some or all of the selected advertisements to another device associated with the customer, such as, for example, personal computer 148 and/or mobile device 160. In another implementation, ad selector 480 may provide the selected advertisements to the customer via super head end 120 or local head end 110.

Ad provider interface 495 may receive advertisements, or information about advertisements, from advertiser providers 135 and may store the received advertisements, or information about advertisements, in ads database 490.

Although FIG. 4 shows exemplary functional components of keyword system 130, in other implementations, keyword system 130 may include fewer functional components, different functional components, differently arranged functional components, or additional functional components than depicted in FIG. 4. Additionally or alternatively, one or more functional components of keyword system 130 may perform functions described as being performed by one or more other functional components of keyword, system 130.

Figure 5A:
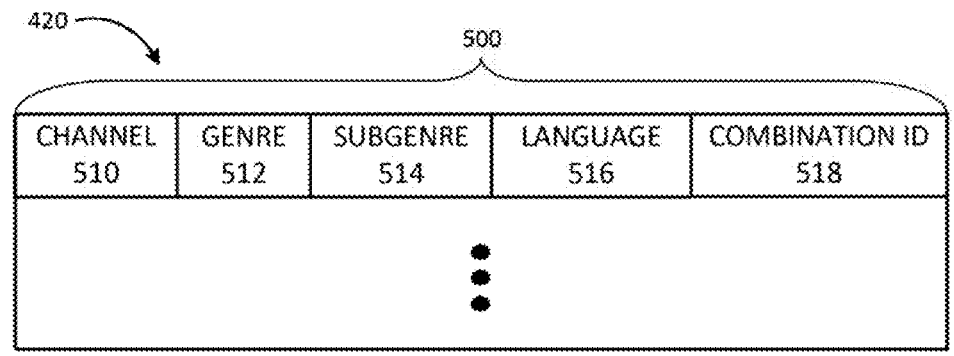
FIG. 5A is a diagram illustrating exemplary components that may be stored, in the channel table of FIG. 4.

FIG. 5A is a diagram illustrating exemplary components that may be stored in channel table 420. As shown in FIG. 5A, channel table 420 may include one or more channel entries 500 (referred to herein collectively as "channel entries 500" and individually as "channel entry 500"). Channel entry 500 may include a channel field 510, a genre field 512, a subgenre field 514, a language field 516, and a combination identifier (ID) field 518.

Channel field 510 may include information identifying a particular television channel (e.g., Disney Channel. History Channel, Showtime, Cine Mexicano, etc). Genre field 512 may include information, identifying a genre associated with the particular television, channel (e.g., Cooking, Documentary, Family, Health, International, Kids, Movies, News, Sports, etc.). Subgenre field 514 may include information identifying a particular subgenre associated with the particular television channel. For example, for a Documentary genre, subgenres may include Biography, Crime, Educational, History, Military, Pets, Science, Wildlife, and/or another subgenre. Language field 516 may store information identifying a particular language associated with the particular television channel (e.g., English, Spanish, German, Chinese, Arabic, etc.). Combination ID field 518 may include a combination identifier assigned to the particular television channel.

Although FIG. 5A shows exemplary components that may be stored in channel, table 420, in other implementations, channel table 420 may include fewer functional components, different functional components, differently arranged functional components, or additional functional components than depicted in FIG. 5A.

Figures 5B, 5C:
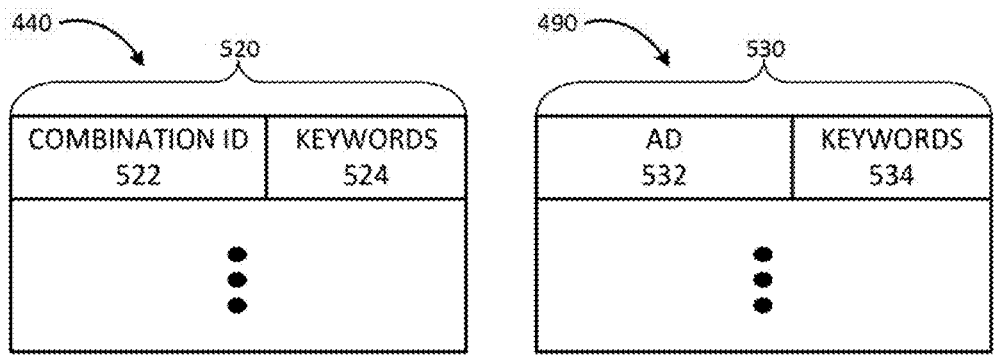
FIG. 5B is a diagram illustrating exemplary components that may be stored in the keyword table of FIG. 4.
FIG. 5C is a diagram illustrating exemplary components that may be stored in the advertisement database of FIG. 4.

FIG. 5B is a diagram illustrating exemplary components that, may be stored in keyword table 440. As shown in FIG. 5B, keyword table 440 may include one or more combination ID entries 520 (referred to herein collectively as "combination ID entries 520" and individually as "combination ID entry 520"). Combination ID entry 520 may include a combination ID field 522 and a keywords field 524. Combination ID field 522 may identify a particular combination ID, Keywords field 524 may include information identifying one or more keywords that have been assigned to the particular combination ID. For example, a combination identifier assigned to a combination that includes channels associated with a Documentary genre, a wildlife subgenre, and the English language may be assigned the following keywords: "wildlife," "animal," "ecotourism," "conservation."

Although FIG. 5B shows exemplary components that may be stored in keyword table 440, in other implementations, keyword table 440 may include fewer functional components, different functional components, differently arranged functional components, or additional functional components than depicted in FIG. 5B.

FIG. 5C is a diagram illustrating exemplary components that may be stored in advertisement database 490. As shown in FIG. 5C, advertisement database 490 may include one or more advertisement (ad) records 530 (referred to herein collectively as "ad records 530" and individually as "ad record 530"). Ad record 530 may include an ad field 532 and a keywords field 534. Ad field 532 may store a particular advertisement, may point to a particular advertisement, and/or may include information identifying a particular advertisement. Keywords field 534 may store one or more keywords associated with the particular advertisement. For example, an advertisement for a travel package to a Caribbean island may include the following keywords: "travel," "beach," "island," "vacation."

Although FIG. 5C shows exemplary components that may be stored in advertisement database 490, in other implementations, advertisement database 490 may include fewer functional components, different functional components, differently arranged functional components, or additional functional components than depicted in FIG. 5C.

Figure 5D:
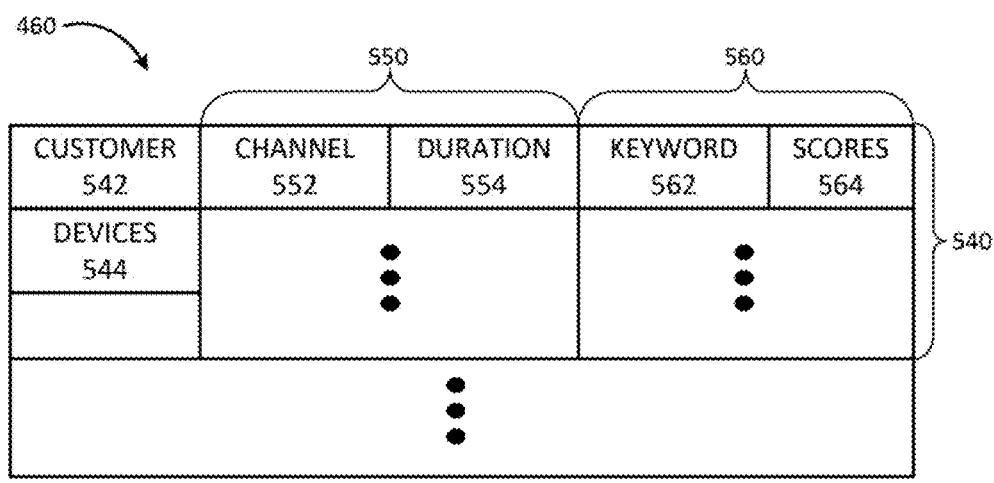
FIG. 5D is a diagram illustrating exemplary components that may be stored in the customer database of FIG. 4.

FIG. 5D is a diagram illustrating exemplary components that may be stored in customer database 460. As shown in FIG. 5D, customer database 460 may include one or more customer records 540 (referred to herein collectively as "customer records 540" and individually as "customer record 540"). Customer record 540 may include a customer field 542, a devices field 544, a viewing history field 550, and a keywords field 560.

Customer field 542 may include information identifying a particular customer. For example, customer field 542 may store an account number associated with the customer, a username and/or password associated with the customer, a name associated with the customer, and/or other information that may identify the particular customer. Devices field 544 may include information identifying devices associated with the customer. For example, devices field 544 may include information identifying STB 144 associated with the particular customer, such as a set-top box identifier. Additionally, devices field 544 may include information identifying other devices associated with the customer, such as, for example, personal computer 148 and/or mobile device 160.

Viewing history field 550 may include information associated with the customer's viewing history. Viewing history field 550 may include one or more channel entries 552 and corresponding duration entries 554. Each channel entry 552 may identify a particular television channel and the corresponding duration entry 554 may include information about the amount of time that the customer viewed the particular television channel.

Keywords field 560 may store keywords associated with the customer. Keywords field 560 may include one or more keyword entries 562 and corresponding scores entries 564. Each keyword entry 562 may include a particular keyword and the corresponding scores entry 564 may include one or more scores computed for the keyword, such as a duration score, a percentage score, a ranking score, and/or a keyword score. Viewing history field 550 may be updated at particular intervals (e.g., once a month) and keywords field 560 may be updated based on the updated information in viewing history field 550.

Although FIG. 5D shows exemplary components that may be stored in customer database 460, in other implementations, customer database 460 may include fewer functional components, different functional components, differently arranged functional components, or additional functional components than depicted in FIG. 5D.

Figure 6:
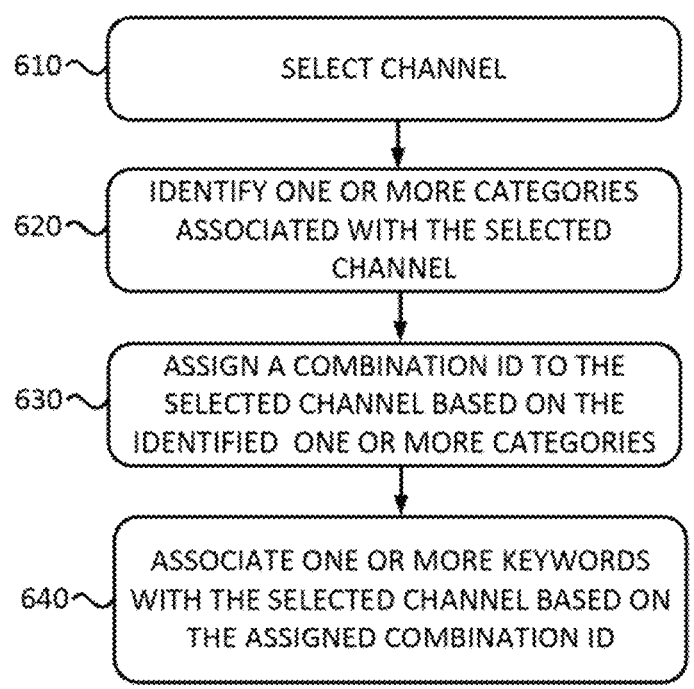
FIG. 6 is a flow chart of an exemplary process for associating keywords and channels according to an implementation described herein.

FIG. 6 is a flow chart of an exemplary process for associating keywords and channels according to an implementation described herein, in one implementation, the process of FIG. 6 may be performed by STB 144. In other implementations, some or all of the process of FIG. 6 may be performed by another device or a group of devices separate from STB 144 and/or including STB 144, such as personal computer 148 and/or mobile device 160.

The process of FIG. 6 may include selecting a channel (block 610). For example, channel, classifier 410 may select a television channel from a list of television channels provided to customer premises 140 by local head end 110.

One or more categories may be associated with the selected channel (block 620). For example, channel classifier 410 may select a genre, a subgenre, and/or a language for the selected channel A combination ID may be assigned to the channel based on the one or more categories (block 630). For example, channel classifier 410 may select a unique combination ID that has not been assigned to another combination of genre, subgenre, and language and may assign the selected combination ID to the selected channel.

One or more keywords may be associated with the selected channel based on the assigned combination ID (block 640). For example, keyword manager 430 may assign one or more keywords to the assigned combination ID. For example, keyword manager 430 may receive input from an administrator that has entered one or more keywords to be assigned to the combination ID. As another example, keyword manager 430 may analyze content associated with a television channel associated with the combination ID, such as a title, description, and/or other metadata associated with the television channel. Keyword manager 430 may determine whether a particular word or phrase occurs with, at least, a particular frequency. Keyword manager 430 may eliminate words or phrases that may not be relevant to a particular television channel by, for example, comparing the particular word or phrase to a list of stop words and phrases.

Figure 7:
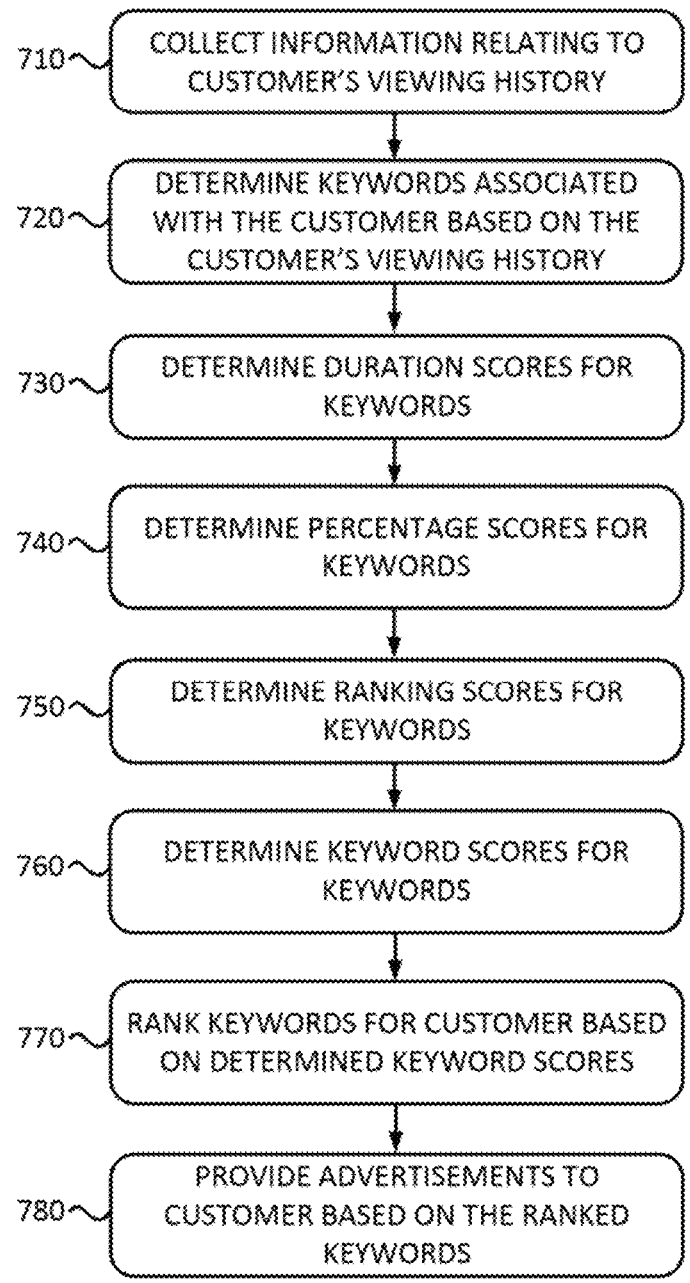
FIG. 7 is a flow chart of an exemplary process for determining keyword associated with a customer according to an implementation described herein.

FIG. 7 is a flow chart of an exemplary process for determining keyword associated with a customer according to an implementation described herein. In one implementation, the process of FIG. 7 may be performed by keyword system 130, in other implementations, some or all of the process of FIG. 7 may be performed by another device or a group of devices separate from keyword system 130 and/or including keyword system 130.

The process of FIG. 7 may include collecting information relating to the customer's viewing history (block 710). For example, STB interface 470 may receive information from STB 144 relating to the viewing history of the customer associated with STB 144.

Keywords associated with the customer may be determined based on the customer's viewing history (block 720). For example, keyword score generator 450 may determine a combination ID for a channel included in the customer's viewing history and may determine keywords associated with the combination ID by accessing keyword table 440.

Duration scores for keywords may be determined (block 730). For example, keyword score generator 450 may determine a duration score for a keyword associated with the customer. The duration score may depend on the total viewing time for a keyword for the customer. In order to determine a total duration time associated with a keyword, all television channels, associated with the keyword, in the customer's viewing history may be identified and the duration times of the identified television channels may be summed to determine the total duration time associated with the keyword for the customer.

Some customers may watch television infrequently while other customers may watch television on a more regular basis, hi order to bring duration times associated with keywords to a common base, a duration score may be scaled based on the following equation:

$$\text{Duration Score} = a * \tan^{-1}(D/b) \quad \text{Equation (1)}$$

In Equation (1), "$\tan^{-1}$" may represent an inverse tangent function, "D" may correspond to the logged duration time associated with a keyword for the customer, "a" may correspond to a limiting factor that may limit the duration score to a particular range (e.g., if $a=20/\pi$, the duration score may be limited to a range of 0 to 10), and "b" may correspond to a duration normalization factor (e.g., 25 hours). An exemplary graph of Equation (1) is described below with reference to FIG. 8.

Percentage scores for the keywords may be determined (block 740). For example, keyword score generator 450 may determine a percentage score for a keyword associated with the customer. The percentage score may depend on the percentage duration time of the keyword compared to duration time of all the keywords associated with the user. For example, if a first customer has a duration time of 10 hours for the keyword "business news" and a total duration time of 15 hours for all keywords, and a second customer has a duration of 15 hours for the keyword "business news" and a total duration time of 200 hours, the keyword "business news" may be more representative of the first customer than the second customer. An example table that may be used to determine a percentage score for a keyword is shown below;

| Lower Range | Percentage Duration Upper Range | Percentage Score |
| --- | --- | --- |
| 0 | <2 | 0 |
| 2 | <5 | 1 |
| 5 | <8 | 2 |
| 8 | <11 | 3 |
| 11 | <14 | 4 |
| 14 | <17 | 5 |
| 17 | <20 | 6 |
| 20 | <25 | 7 |
| 25 | <30 | 8 |
| 30 | <40 | 9 |
| 40 | >40 | 10 |

Thus, for example, for the first customer described above, the percentage duration for the keyword "business news" may be 10/15×10066%, resulting in a percentage score of 10. For the second customer described above, the percentage duration for the keyword "business news" may be 15/200× 100=7.5%, resulting in a percentage score of 2.

Ranking score for the keywords may be determined (block 750). For example, keyword score generator 450 may determine a ranking score for a keyword associated with the customer. Some keywords, such as, for example, the keyword "kids" or the keyword "sports," may be mapped to a higher number of channels, while other keywords, such as, for example, the keyword "history," may be mapped to a lower number of channels. Thus, if a customer is associated with a duration time of 10 hours with respect to the keyword "history" and is associated with a duration time of 15 hours with respect to the keyword "sports," the keyword "history" may be more relevant for the customer. The ranking score may reflect the relevance of particular keywords with respect to the customer. The ranking score may depend on the ranking of the customer with respect to the keyword compared to the ranking of other customers with respect to the keyword. The ranking score may be computed using the following equation:

$$\text{Ranking Score} = 10 - \text{int}(10 * n/N) \quad \text{Equation (2)}$$

In Equation (2), "int" may represent an integer function that rounds the argument to the nearest integer, "N" may correspond to the total number of customers associated with the keyword, and "n" may correspond to the customer's ranking among all the customers associated with the keyword measured based on the duration times associated with the keyword. For example, if a first customer has a duration time of 10 hours for a keyword and a second customer has a duration time of 5 hours for the keyword, the first customer may be ranked higher than the second customer. An exemplary graph of Equation (2) is described below with reference to FIG. 9.

Keyword scores for the keywords may be determined (block 760). For example, keyword score generator 450 may determine a keyword score for a keyword associated with the customer based on the duration score associated with the keyword, the percentage score associated with the keyword, and/or the ranking score associated with the keyword. The keyword score may computed based on following equation:

$$\text{Keyword Score} = a*(\text{Duration Score}) + b*(\text{Percentage Score}) + c*(\text{Ranking Score}) \quad \text{Eq (3)}$$

In Equation (3), "a," "b." and "c" may correspond to constants that may differ based on a particular customer and/or a particular keyword, with $0 < a \leq 1$, $0 < b \leq 1$, and $0 < c \leq 1$. As an example, the constant "a" may be increased for a customer when the total viewing duration time for the customer is higher than a first threshold number. As another example, the constant "b" may be increased when a total viewing duration time for the customer is lower than a second threshold number. As yet another example, the constant "c" may be increased when a number of television channels associated with a keyword is less than a third threshold.

The keywords for the customer may be ranked based on the determined keyword scores (block 770). For example, keyword score generator 450 may rank the keywords for the customer based on the determined keyword scores. For example, the keyword with the highest, keyword score may be ranked first, the keyword with the second highest score may be ranked second, etc.

Advertisements may be provided to the customer based on the ranked keywords (block 780). For example, ad selector 480 may select one or more advertisements for the customer based on the ranked keywords. For example, if the keyword ranked as first for a customer is "sports," ad selector 480 may select an advertisement associated with the keyword, "sports" (e.g., an advertisement for a subscription to a sports program). As an example, the advertisements may be provided by keyword system 130 to STB 144. STB 144 may run one of the selected advertisements when the content being broadcast on a television channel being viewed by the customer reached an advertisement slot. As another example, the advertisements may be provided to another device associated with the customer, such as personal, computer 148 and/or mobile device 160. For example, ad selector 480 may select a graphical advertisement that may be displayed on a web page when the user uses a web browser associated with personal computer 148.

Figure 8:
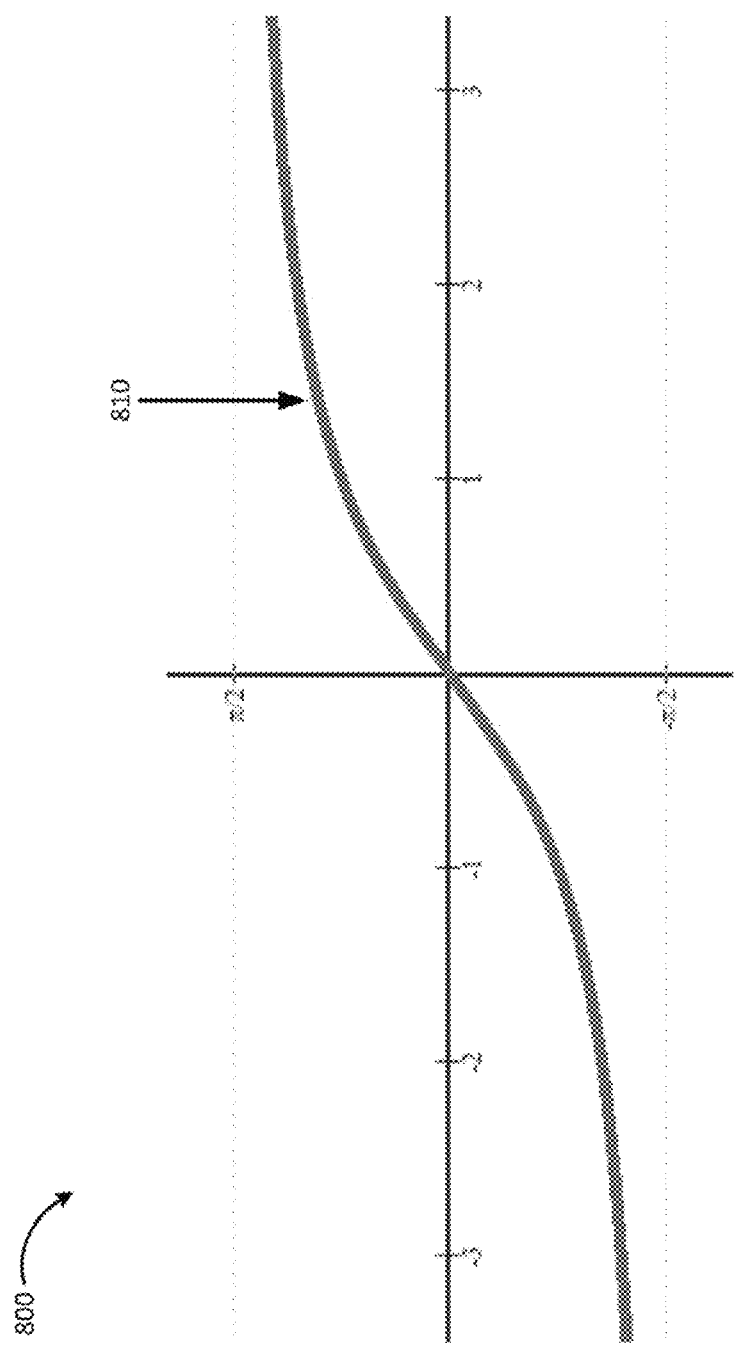
FIG. 8 is a diagram of an exemplary function that may be used to determine a duration score for a keyword according to an implementation described herein.

FIG. 8 is a diagram of an exemplary graph 800 that may be used to determine a duration score for a keyword according to an implementation described herein. Graph 800 may include a function 810 that may correspond to Equation (1). As shown, in FIG. 8, function 810 may approach a linear function between 0 and 1, and thus the value of a duration score may be linear until a particular duration time, after which the duration score may not increase significantly.

Figure 9:
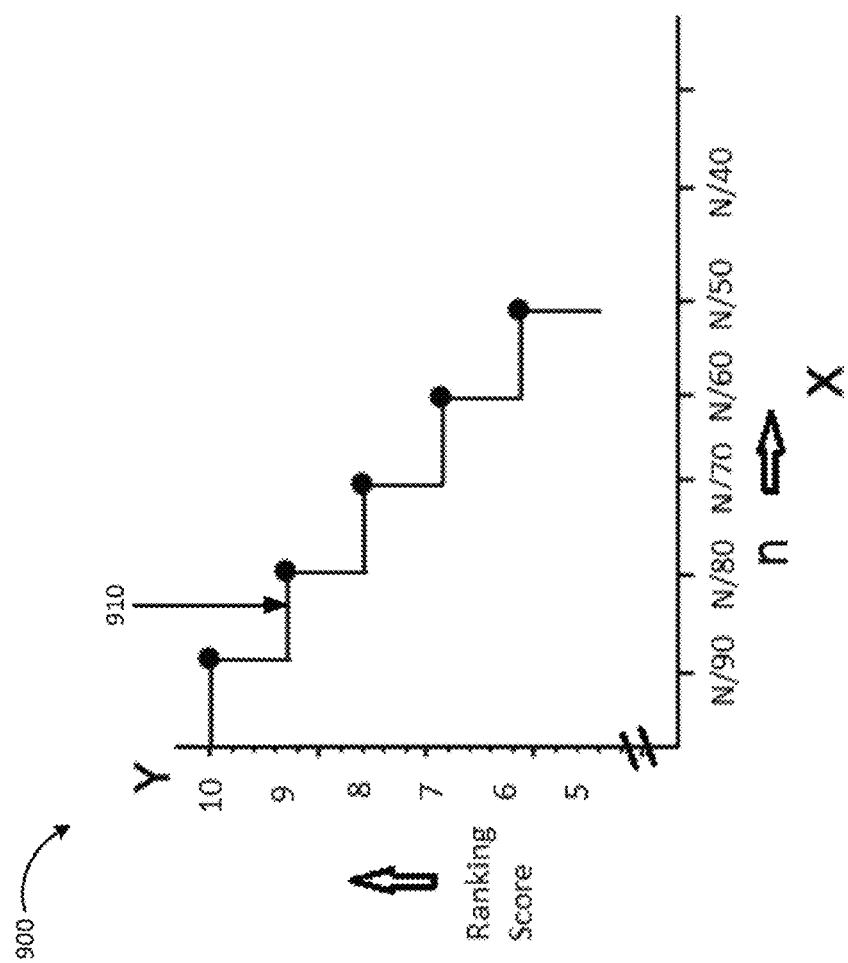
FIG. 9 is a diagram of an exemplary function that may be used to determine a ranking score for a keyword according to an implementation described herein.

FIG. 9 is a diagram of an exemplary graph 900 that may be used to determine a ranking score for a keyword according to an implementation described herein. Graph 900 may include a function 910 that may correspond to Equation (2). As shown in FIG. 9, function 910 may correspond to a descending step function dependent on the ranking of a customer compared to other customers with respect to a keyword. For example, if a customer's ranking is higher than 90% of the other customers associated with a keyword, the ranking score for the keyword with respect to the customer may be 10, if the customer's ranking is between 90% and 80% with respect to the other customer's associated with the keyword, the ranking score for the keyword with respect to the customer may be 9, etc.

Figure 10:
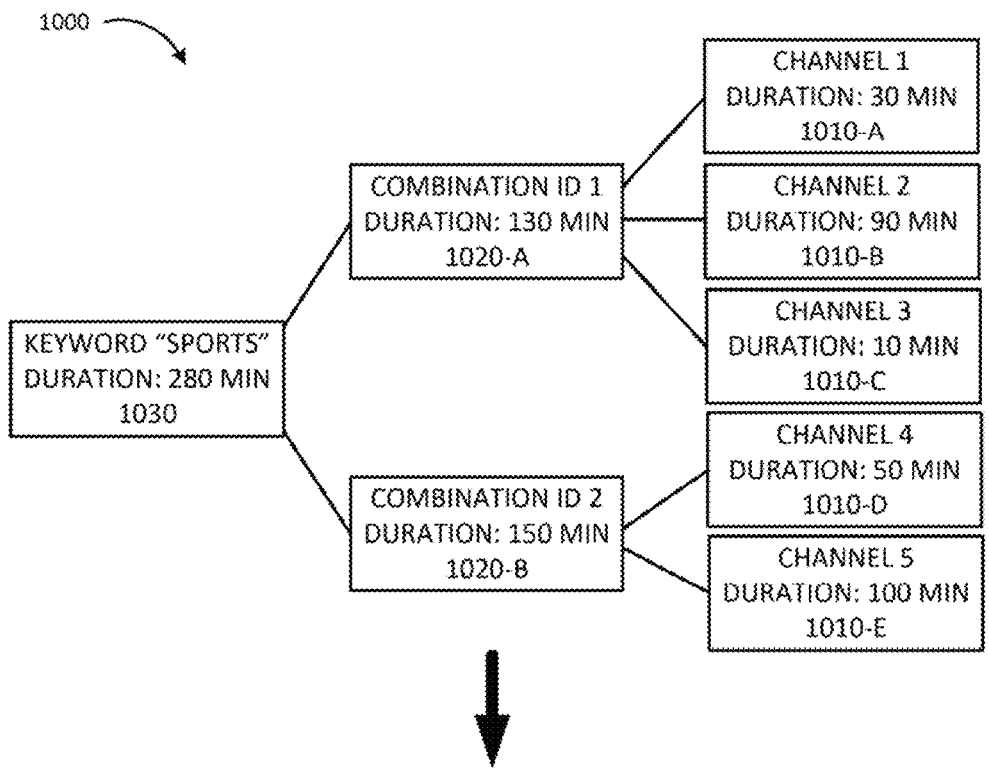
FIG. 10 is a diagram of an example for determining a score for a keyword according to an implementation described herein.

FIG. 10 is a diagram of an example 1000 for determining a score for a keyword according to an implementation described herein. Example 1000 may include part of a viewing history associated with a customer for keyword "sports" 1030, which may include a first television channel 1010-A with a recorded viewing duration of 30 minutes, a second television channel 1010-B associated with a recorded viewing duration of 90 minutes, a third television channel 1010-C associated with a recorded viewing duration of 10 minutes, a fourth television channel 1010-D associated with a recorded viewing duration of 50 minutes, aid a fifth television channel 1010-E associated with a recorded viewing duration of 100 minutes. The first television channel 1010-A, second television channel 1010-B, and third television channel 1010-C may be associated with a first combination ID 1020-A for a duration time of 130 minutes and fourth television channel 1010-D and filth television channel 1010-E may be associated with a second combination ID 1020-B for a duration time 150 minutes. Thus, the total duration time for keyword A 1030 may be 280 minutes.

A keyword score 1040 may be computed, for keyword "sports" 1030 based on the total duration time of 280 minutes. For example, a duration score for keyword "sports" 1030 may be computed as a value of 1.19, a percentage score for keyword "sports" 1030 may be computed as a value of 5, and a percentage score for keyword "sports" 1030 may be computed as a value of 8. The keyword score 1040 may be computed as a weighted average as a value of 5.138. Keyword score 1040 may be used to rank keyword "sports" 1030 among other keywords associated with the customer.

Table 1050 illustrates the keywords associated with the customer, the corresponding keyword scores, and the keyword rank based on the computed keyword scores. As shown in table 1050, the keyword "sports" 1030 may be ranked second among the keywords associated with the customer, after the keyword "family." Thus, when ad selector 480 is selecting advertisements for the customer, advertisements associated with the keyword "family" may be given the highest priority, followed by advertisements associated with the keyword "sports," followed by advertisements associated with the keyword "football".

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 6 and 7, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood, that software and control hardware can be designed to implement the systems and methods based on the description herein.

Further, certain portions, described above, may be implemented, as a component that performs one or more functions. A component, as used herein, may include hardware, Such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method performed by a computer device, the method comprising:
    obtaining, by the computer device, a viewing history, associated with a customer, front a mobile device associated with the customer, wherein the viewing history relates a particular content channel to a duration time associated with the particular content channel;
    determining, by the computer device, a keyword, associated with the customer, based on the obtained viewing history;
    determining, by the computer device, all content channels, in the obtained viewing history, that are associated with the keyword;
    determining, by the computer device, a total viewing duration for the keyword based on a sum of the duration times of all the content channels associated with the keyword;
    determining, by the computer device, a duration score for the keyword based on the determined total viewing duration for the keyword;
    calculating, by the computer device, a keyword score based on the determined duration score;
    selecting, by the computer device, an advertisement, associated with the keyword, based on the calculated keyword score; and
    providing, by the computer device, the selected advertisement to the mobile device associated with the customer.

2. The method of claim 1, further comprising:
    selecting the particular content channel;
    identifying one or more categories associated with the selected particular content channel;
    assigning a combination identifier to the selected particular content channel based on the identified one or more categories; and
    associating one or more keywords with the assigned combination identifier.

3. The method of claim 2, wherein identifying the one or more categories associated with the selected particular content channel includes;
    identifying a genre associated with the particular content channel;
    identifying a subgenre associated with the particular content channel; and
    identifying a language associated with the particular content channel.

4. The method of claim 1, wherein determining the keyword, associated with the customer, based on the obtained viewing history includes:
    determining a combination identifier for a particular content channel included in the viewing history, wherein the combination identifier is associated with one or more categories associated with the particular content channel; and
    selecting the keyword from a set of one or more keywords associated with the combination identifier.

5. The method of claim 1 wherein a content channel is a content stream.

6. The method of claim 1, wherein calculating the keyword score for the keyword based on the obtained viewing history further includes:
    determining a total viewing duration time for the customer based on the obtained viewing history;
    determining a percentage score for the keyword based on a ratio of the total viewing duration for the keyword and the total viewing duration time for the customer; and
    determining the keyword score based on the determined percentage score.

7. The method of claim 6, wherein calculating the keyword score for the keyword based on the obtained viewing history further includes:
    identifying other customers associated with the keyword;
    determining a number of the identified other customers associated with the keyword;
    determining a total viewing duration for the keyword for each of the identified other customers;
    determining a ranking number for the customer with respect to the identified other customers based on the total viewing duration for the keyword for the customer and based on the determined total viewing duration for the keyword for each of the identified other customers;
    determining a ranking score for the keyword based on a ratio of the ranking number for the customer and the number of the identified other customers associated with the keyword; and
    determining the keyword score based on the determined ranking score.

8. The method of claim 7, further comprising;
    determining the keyword score as a weighted average of the determined duration score, the determined percentage score, and the determined ranking score.

9. The method of claim 8, further comprising:
    increasing a weight associated with the determined duration score when the total viewing duration time for the customer is higher than a particular thresh old number.

10. The method of claim 8, further comprising;
increasing a weight associated with the determined percentage score when the total viewing duration time for the customer is lower than a particular threshold number.

11. The method of claim 8, further comprising:
increasing a weight, associated with the determined ranking score when a number of content channels associated with the keyword is less than a particular threshold number.

12. A system comprising:
at least one server device configured to:
obtain a viewing history, associated with a customer, from a mobile device associated with the customer, wherein the viewing history relates a particular content channel to a duration time associated with the particular content channel;
determine a keyword, associated with the customer, based on the obtained viewing history;
determine all content channels, in the obtained viewing history, that are associated with the keyword;
determine a total viewing duration for the keyword based on a sum of the duration times of all the content channels associated with the keyword;
determine a duration score for the keyword based on the determined total viewing duration for the keyword;
calculate a keyword score based on the determined duration score;
select an advertisement, associated with the keyword, based on the calculated keyword score; and
provide the selected advertisement to the mobile device associated with the customer, based on selecting the advertisement.

13. The system of claim 12, wherein the at least one server device is further configured to:
select the particular content channel;
identify one or more categories associated with the selected particular content channel;
assign a combination identifier to the selected particular content channel based on the identified one or more categories; and
associate one or more keywords with the assigned combination identifier.

14. The system of claim 12, wherein the at least one server device is further configured to:
determine a combination identifier for a particular content channel included in the viewing history, wherein the combination identifier is associated with one or more categories associated with the particular content channel; and
select the keyword from a set of one or more keywords associated with the combination identifier.

15. The system of claim 12 wherein a content channel is a content stream.

16. The system of claim 12, wherein the at least one server device is further configured to;
determine a total viewing duration time for the customer based on the obtained viewing history;
determine a percentage score for the keyword based on a ratio of the total viewing duration for the keyword and the total viewing duration time for the customer; and
determine the keyword score based on the determined percentage score.

17. The system of claim 16, wherein the at least one server device is further configured to:
identify other customers associated with the keyword;
determine a number of the identified other customers associated with the keyword;
determine a total viewing duration for the keyword for each of the identified other customers;
determine a ranking number for the customer with respect to the identified other customers based on the total viewing duration for the keyword for the customer and based on the determined total viewing duration for the keyword for each of the identified other customers;
determine a ranking score for the keyword based on a ratio of the ranking number for the customer and the number of the identified other customers associated with the keyword; and
determine the keyword score based on the determined ranking score.

18. The system of claim 17, wherein the at least one server device is further configured to:
determine the keyword score as a weighted average of the determined duration score, the determined percentage score, and the determined ranking score.

19. A non-transitory computer-readable medium storing instructions executable by one or more processors, the non-transitory computer-readable medium comprising:
one or more instructions to obtain a viewing history, associated with a customer, from a mobile device associated with the customer, wherein the viewing history relates a particular content channel to a duration time associated with the particular content channel;
one or more instructions to determine a keyword, associated with the customer, based on the obtained viewing history;
one or more instructions to determine all content channels, in the obtained viewing history, that are associated with the keyword;
one or more instructions to determine a total viewing duration for the keyword based on a sum of the duration times of all the content channels associated with the keyword;
one or more instructions to determine a duration score for the keyword based on the determined total viewing duration for the keyword;
one or more instructions to calculate a keyword score based on the determined duration score;
one or more instructions to select an advertisement, associated with the keyword, based on the calculated keyword score; and
one or more instructions to provide the selected advertisement to the mobile device associated with the customer, based on selecting the advertisement.

20. The non-transitory computer-readable medium of claim 19, further comprising:
one or more instructions to determine a total viewing duration time for the customer based on the obtained viewing history;
one or more instructions to determine a percentage score for the keyword based on a ratio of the total viewing duration for the keyword and the total viewing duration time for the customer;
one or more instructions to identify other customers associated with the keyword;
one or more instructions to determine a number of the identified other customers associated with the keyword;
one or more instructions to determine a total viewing duration for the keyword for each of the identified other customers;
one or more instructions to determine a ranking number for the customer with respect to the identified other customers based, on the total viewing duration for the keyword for the customer and based on the determined total viewing duration for the keyword for each of the identified other customers;

one or more instructions to determine a ranking score for the keyword based on a ratio of the ranking number for the customer and the number of the identified other customers associated with the keyword; and one or more instructions to determine the keyword score as a weighted average of the determined duration score, the determined percentage score, and the determined ranking score.

* * * * *